US010658799B2

United States Patent
Hsu et al.

(10) Patent No.: US 10,658,799 B2
(45) Date of Patent: May 19, 2020

(54) TRANSMISSION CABLE AND DISPLAY SYSTEM

(71) Applicant: Innolux Corporation, Miao-Li County (TW)

(72) Inventors: Chih-Yang Hsu, Miao-Li County (TW); Chien-Hung Chen, Miao-Li County (TW); Heng-Chang Chang, Miao-Li County (TW); Chin-Lung Ting, Miao-Li County (TW); Cheng-Te Wang, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 195 days.

(21) Appl. No.: 15/871,120

(22) Filed: Jan. 15, 2018

(65) Prior Publication Data

US 2018/0241161 A1 Aug. 23, 2018

(30) Foreign Application Priority Data

Feb. 21, 2017 (CN) .......................... 2017 1 0093006

(51) Int. Cl.
*H01R 13/719* (2011.01)
*H01R 13/646* (2011.01)
(Continued)

(52) U.S. Cl.
CPC ........... *H01R 13/719* (2013.01); *G09G 5/006* (2013.01); *H01B 7/17* (2013.01); *H01B 11/1813* (2013.01); *H01B 11/1834* (2013.01); *H01R 13/646* (2013.01); *H01R 24/60* (2013.01); *H04N 7/108* (2013.01); *G09G 2370/10* (2013.01);
(Continued)

(58) Field of Classification Search
CPC ...... H01R 13/719; H01R 13/646; H01B 7/17; H01B 11/1813; H01B 11/1834
See application file for complete search history.

(56) References Cited

U.S. PATENT DOCUMENTS 6,602,092 B2 * 8/2003 Soubh .................... H01R 12/62
439/493
10,135,200 B2 * 11/2018 Misgen .................... G01R 5/00
(Continued)

FOREIGN PATENT DOCUMENTS

CN 205376947 7/2016
CN 205376965 7/2016
(Continued)

OTHER PUBLICATIONS

"Office Action of China Counterpart Application," dated Apr. 29, 2019, p. 1-p. 8.

*Primary Examiner* — Abdullah A Riyami
*Assistant Examiner* — Nader J Alhawamdeh
(74) *Attorney, Agent, or Firm* — JCIPRNET

(57) ABSTRACT

A transmission cable including a signal wire and a shielding layer is provided. The signal wire is configured to transmit a differential signal provided by an eDP interface or a V-by-one interface. The shielding layer is configured to cover the signal wire. An end of the signal wire receives the differential signal provided by the eDP interface or the V-by-one interface, and another end of the signal wire outputs the differential signal provided by the eDP interface or the V-by-one interface. In addition, a display system is also provided.

19 Claims, 8 Drawing Sheets

(51) Int. Cl.
  *H01B 7/17*    (2006.01)
  *H01B 11/18*   (2006.01)
  *H01R 24/60*   (2011.01)
  *H04N 7/10*    (2006.01)
  *G09G 5/00*    (2006.01)
  *H01B 11/20*   (2006.01)
  *H04N 21/4363* (2011.01)

(52) U.S. Cl.
  CPC .......... *G09G 2370/12* (2013.01); *H01B 11/20* (2013.01); *H04N 21/43635* (2013.01)

(56) References Cited

U.S. PATENT DOCUMENTS

| | | | |
|---|---|---|---|
| 2008/0050968 A1* | 2/2008 | Chang | H01R 12/725 439/607.01 |
| 2014/0097021 A1* | 4/2014 | Su | H05K 9/00 174/72 R |
| 2015/0129278 A1* | 5/2015 | Li | H01B 7/0892 174/107 |
| 2018/0241161 A1* | 8/2018 | Hsu | G09G 5/006 |

FOREIGN PATENT DOCUMENTS

| | | | |
|---|---|---|---|
| CN | 205609230 | | 9/2016 |
| JP | 2016025593 | | 2/2016 |
| JP | 2016025593 A | * | 2/2016 |
| KR | 101639718 | | 7/2016 |

* cited by examiner

TRANSMISSION CABLE AND DISPLAY SYSTEM

CROSS-REFERENCE TO RELATED APPLICATION

This application claims the priority benefit of China application serial no. 201710093006.1, filed on Feb. 21, 2017. The entirety of the above-mentioned patent application is hereby incorporated by reference herein and made a part of this specification.

BACKGROUND OF THE DISCLOSURE

1. Field of the Disclosure

The disclosure relates to a wire, particularly relates to a transmission cable and a display system using the transmission cable.

2. Description of Related Art

Through the development of liquid crystal displays (LCDs), LCD TVs have become quite popular, and large-sized LCDs have become the mainstream in the development of LCD TVs. Also, how to reduce the thickness is also a concern in the current development of the large-sized LCDs. However, there are numerous types of transmission signals in the conventional LCDs, and the transmission interfaces of the signals are different. Also, some of the signals are limited by the distance of transmission, making it unable to achieve the application of long-distance board-to-board, device-to-device communication in internal modules of the large-sized LCDs. The manufacturing cost and the complexity of the design of the system are also increased. Thus, how to cope with these issues has become crucial in the development of large-sized LCDs.

SUMMARY OF THE DISCLOSURE

The disclosure provides a transmission cable, suitable for a split-type display system for transmission of a differential signal in a longer distance.

A transmission cable of the disclosure includes a signal wire and a shielding layer. The signal wire is configured to transmit a differential signal provided by an eDP interface or a V-by-one interface. The shielding layer is configured to cover the signal wire. One end of the signal wire receives the differential signal provided by the eDP interface or the V-by-one interface, and another end of the signal wire outputs the differential signal to another eDP interface or another V-by-one interface.

A display system of the disclosure provides a display, a conversion module, and a transmission cable. The display at least has an eDP interface or a V-by-one interface. The conversion module at least has the eDP interface or the V-by-one interface. The transmission cable couples the display and the conversion module and has a signal wire and a shielding layer. In addition, the signal wire is configured to transmit a differential signal between the display and the conversion module. The shielding layer is configured to cover the signal wire. The conversion module generates the differential signal through the eDP interface or the V-by-one interface, and the differential signal is output to the eDP interface or the V-by-one interface of the display through the signal cable.

In view of the foregoing, the disclosure provides the transmission cable suitable for a split type display system for transmission of the eDP signal or the V-by-one signal in a longer distance. The display system may include the display and the conversion module. In other words, the display of the display system of the disclosure is able to effectively save the space for accommodating relevant circuits and wires, and the relevant circuits and wires may be disposed in the conversion module. Accordingly, relevant signals may be provided through the transmission cable of the disclosure. Therefore, the display system of the disclosure is able to effectively simplify a design of the system end and save the cost.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
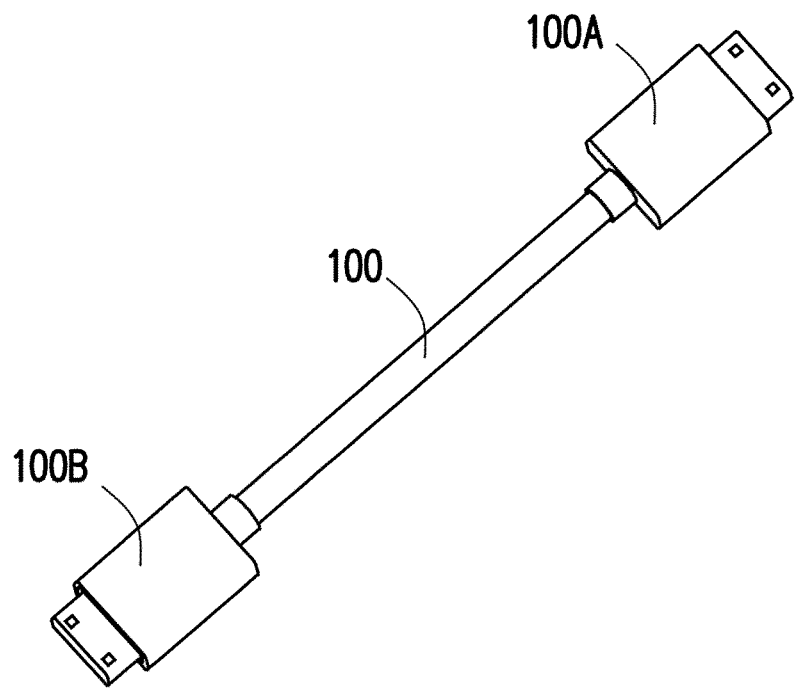
FIG. 1 is a schematic view illustrating a transmission cable according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Several embodiments are provided in the following to describe the disclosure. However, the disclosure is not limited to the embodiments described herein. Also, the embodiments may be properly combined. The term "couple" used throughout the specification (including claims) of the disclosure may refer to any direct or indirect connection means. For example, if the first device is coupled to the second device, it should be interpreted that the first device may be directly coupled to the second device, or the first device may be indirectly connected to the second device through another device or a certain connection means.

FIG. 1 is a schematic view illustrating a transmission cable according to an embodiment of the disclosure. Referring to FIG. 1, a transmission cable 100 has a first connector 100A and a second connector 100B. In the embodiment, the transmission cable 100 is suitable for a split-type display. The display may obtain an image signal or other control signals through a conversion module, for example a set top box (STB), so as to provide a display function. The external conversion module refers to a signal processing device that receives and processes an external signal, converts the signal, and inputs the converted signal to a display panel to display an image frame. In other words, the first connector 100A and the second connector 100B of the transmission cable 100 may be configured to be coupled to the display and the conversion module respectively, so as to transmit a differential signal between the display and the conversion module. In the embodiment, the display and the conversion module may at least respectively include an embedded display port (eDP) interface or a V-by-one interface, and the differential signal is compatible with the eDP interface or the V-by-one interface. The display and the conversion module may further include another signal transmission interface, such as a high definition multimedia interface (HDMI), a UART interface, an SPI interface, a V-by-one interface, or an inter-integrated circuit (I2C) interface, or the like, and the disclosure does not intend to impose a limitation in this regard. In other words, the conversion module may generate an eDP signal or a V-by-one signal that is a differential signal through the eDP interface or the V-by-one interface, and the eDP signal or the V-by-one signal belongs to a high transmission signal. The conversion module may output the eDP signal or the V-by-one signal to the eDP interface or the V-by-one interface through the transmission cable 100. Accordingly, the conversion module may drive the display through the transmission cable 100. By adopting the transmission cable of the disclosure, transmission in a longer distance is enabled, unlike the conventional transmission of the V-by-one signal or the eDP signal through a flat flex cables (FFC) or a flexible printed circuit (FPC) board that only allows board-to-board transmission in a short distance between internal modules of a liquid crystal display (LCD), and the transmission could be applied to external devices and not limited to the inside transmission of the display.

Figure 2A:
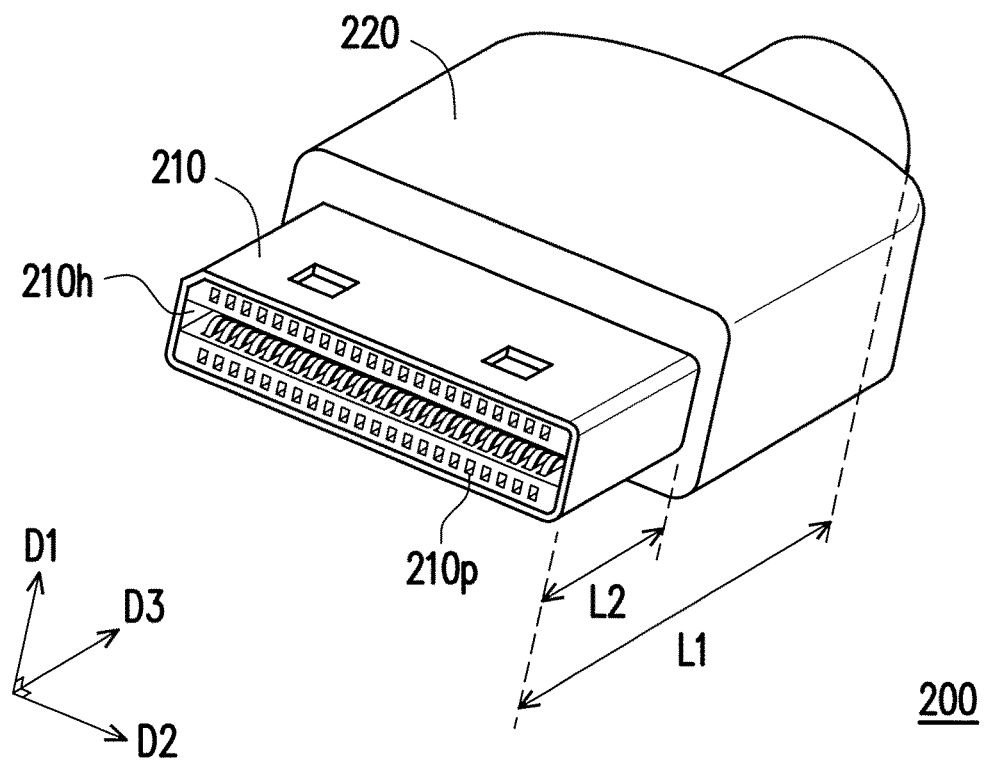
FIG. 2A is a schematic view illustrating a terminal of a transmission cable according to an embodiment of the disclosure.

FIG. 2A is a schematic view illustrating a connector of a transmission cable according to an embodiment of the disclosure. Referring to FIG. 2A, a connector 200 of the transmission cable includes a plug 210 and a cover 220. On a plane formed by a first direction D1 and a second direction D2, the connector 200 has a port 210h. In addition, the port 210 has a plurality of terminals 210p. Moreover, the first direction D1, the second direction D2, and a third direction D3 are respectively perpendicular to each other. In the embodiment, the cover 220 is configured to be coupled to the plug 210. The connector 200 has a first length L1, and a portion of the plug 210 not coupled to the cover 220 has a second length L2.

As an example, in an embodiment, the length L1 of the connector 200 may be 39 mm, and the length L2 of the connector 200 may be 10.6 mm. Alternatively, in another embodiment, the length L1 of the connector 200 may be designed to be 45±0.3 mm, and the length L2 of the connector 200 may be designed to be 9.3±0.3 mm. However, the disclosure is not limited thereto. The first length L1 and the second length L2 of the connector 200 may be designed in correspondence with the specifications of different devices or ports. Moreover, the number of the terminals 210p of the embodiment is not limited by the illustration of the drawings. The number of the terminals 210p may be determined by the number of various signal wires, control wires, power wires, or grounding wires in the transmission cable.

Figure 2B:
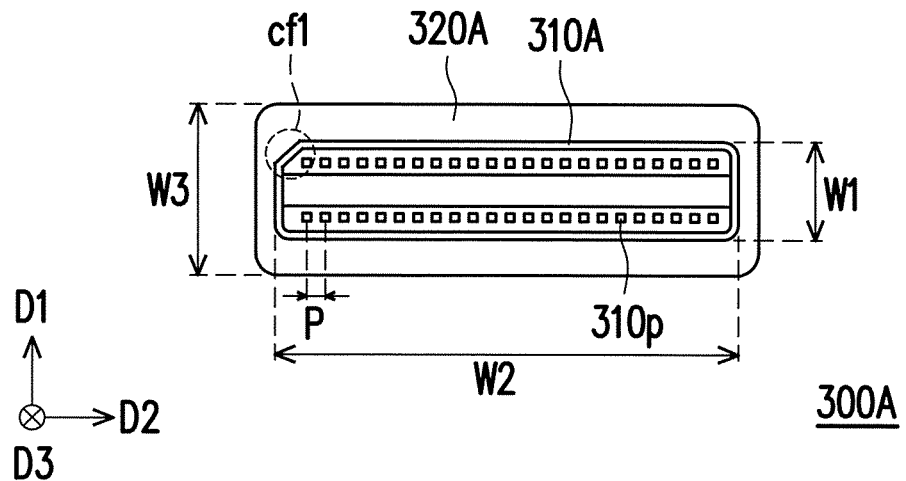
FIG. 2B is a schematic front view illustrating a first connector of a transmission cable according to an embodiment of the disclosure.
Figure 2C:
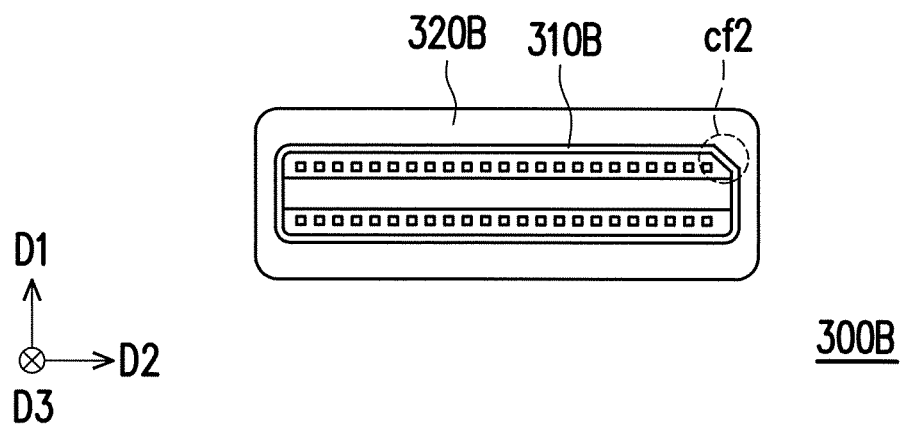
FIG. 2C is a schematic front view illustrating a second connector of a transmission cable according to an embodiment of the disclosure.

FIG. 2B is a schematic front view illustrating a first connector of a transmission cable according to an embodiment of the disclosure. FIG. 2C is a schematic front view illustrating a second connector of a transmission cable according to an embodiment of the disclosure. Referring to FIGS. 2B and 2C, the first connector and the second connector of the respective embodiments of the disclosure may be a first connector 300A and a second connector 300B as shown in FIGS. 2B and 2C, for example. In the embodiment, a plug 310A of the first connector 300A has a port on the plane formed by the first direction D1 and the second direction D2, and the port has a plurality of terminals 310P. The plug 310A has a width W1 in the first direction D1 and a width W2 in the second direction D2. In the embodiment, a cover 320A of the first connector 300A has a width W3 in the first direction D1. A pitch P is provided between two terminals 310P.

As an example, in an embodiment, the width W1 may be 5 mm. The width W2 may be 20.4 mm. The width W3 may be 9.5 mm. The pitch P may be 0.8 mm. However, the disclosure is not limited thereto. The specifications of the first connector 300A and the second connector 300B may be designed in correspondence with the specifications of different devices or ports. Moreover, the number of the terminals 310p may be determined by the number of various signal wires, control wires, power wires, or grounding wires in the transmission cable. Since the transmission cable of the disclosure serves for transmission of differential signals (eDP or V-by-one signals), the number of the terminals 310p may be 32, 36, 46, or other even numbers. However, the disclosure does not intend to impose a limitation in this regard. Moreover, a width of the cover 320A of the first connector 300A in the second direction D2 may be determined by the number of the terminals 310p. The disclosure does not intend to impose a limitation in this regard, either.

In the embodiment, the specification of the second connector 300B is the same as the specification of the first connector 300A. The second connector 300B has a plug 310B and a cover 320B covering the plug 310B. It should be noted that the plugs 310A and 310B of the first connector 300A and the second connector 300B respectively have a chamfered corner cf1 and a chamfered corner cf2. In the embodiment, the chamfered corners cf1 and cf2 serve to prevent the first connector 300A and the second connector 300B from being connected to the display and the conversion module reversely. Moreover, the chamfered corners cf1 and cf2 are respectively located on opposite sides of the first connector 300A and the second connector 300B, as shown in FIGS. 2B and 2C.

Figure 3:
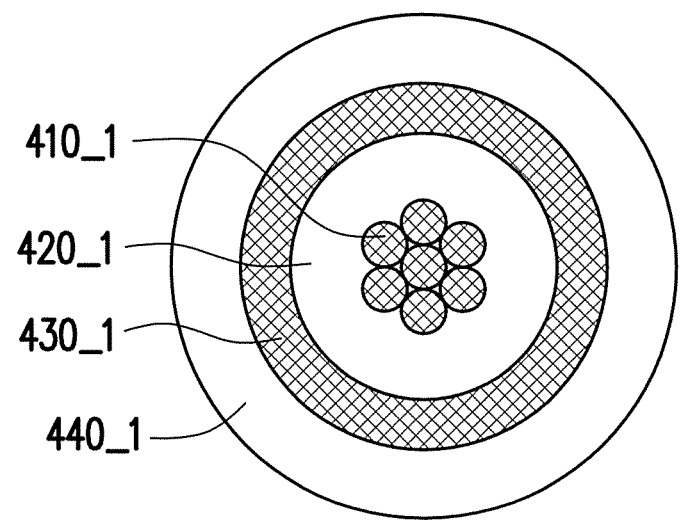
FIG. 3 is a schematic view illustrating a transmission cable according to another embodiment of the disclosure.
Figure 3:
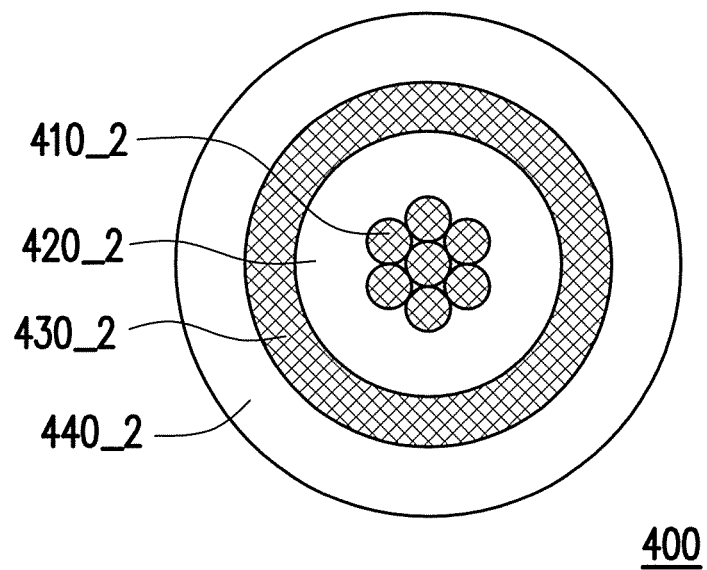

FIG. 3 is a schematic view illustrating a signal wire according to an embodiment of the disclosure. The transmission cable of the respective embodiments of the disclosure may include a plurality of signal wires. Referring to FIG. 3, in the embodiment, a signal wire 400 may include two coaxial wires and serve to transmit a differential signal. The coaxial wires may respectively have core conductors 410_1 and 410_2 and shielding layers 430_1 and 430_2. Insulating layers 420_1 and 420_2 are respectively provided between the core conductors 410_1 and 410_2 and the shielding layers 430_1 and 430_2, and coat layers 440_1 and 440_2 are respectively provided on outer layers of the shielding layers 430_1 and 430_2. In the embodiment, the signal wire 400 may have an impedance matching characteristic, which the signal wire 400 may have impedance ranging from 50 ohms to 150 ohms. The signal wire 400 may have the shielding layers 430_1 and 430_2, and the electromagnetic interference may be reduced, so as to increase a transmission distance of the transmission cable. A material of the shielding layers 430_1 and 430_2 may include aluminum foil, copper foil, copper mesh, or the like, for example. The coat layers 440_1 and 440_2 exhibit an insulating property. Besides, in an embodiment, the coaxial wires may be further covered by an insulating material in the signal wire 400. In other words, in the embodiment, the signal wire 400 covered by the shielding layers 430_1 and 430_2 is able to effectively avoid electromagnetic interference, so as to allow long-distance transmission of the eDP signal or V-by-one signal. However, in an embodiment, further to transmitting the eDP signal or the V-by-one signal, the core conductors 410_1 and 410_2 may also transmit other signals (e.g., signals transmitted via the HDMI, UART interface, SPI interface, V-by-one interface, or I2C interface, etc.), or at least one of the core conductors 410_1 and 410_2 may transmit power and serve as a power wire. In yet another embodiment, a transmission bandwidth of the transmission cable of the disclosure may range from 2.5 Gbps to 8 Gbps. In yet another embodiment, an upper limit of a transmission frequency of the transmission cable of the disclosure may be 5 Gbps. The disclosure does not intend to limit the number of signal wires or power wires, and a combination of the numbers may be arbitrarily modified or arranged based on the design needs.

Figure 4:
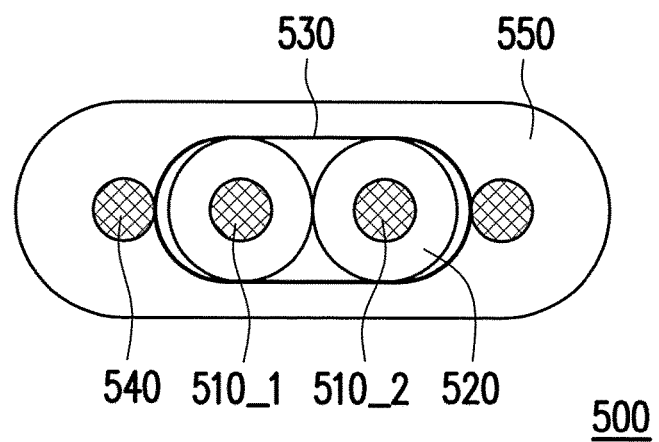
FIG. 4 is a schematic view illustrating a transmission cable according to another embodiment of the disclosure.

FIG. 4 is a schematic view illustrating a signal wire according to another embodiment of the disclosure. The transmission cable of the respective embodiments of the disclosure may include a plurality of signal wires. Each of the signal wires may include at least one pair of differential signals. However, the disclosure does not intend to impose a limitation in this regard. A combination of the numbers may be arbitrarily modified or arranged based on the design needs. Referring to FIG. 4, in the embodiment, a signal wire 500 may include a pair of differential signal wires and serve to transmit a differential signal. The signal wire 500 has two core conductors 510_1 and 510_2 and a shielding layer 530. An insulating layer 530 is provided between the core conductors 510_1 and 510_2 and the shielding layer 530, and a coat layer 550 is disposed on an outer layer of the shielding layer 530. A grounding wire 540 may be optionally disposed on the outer layer of the shielding layer 530. In the embodiment, the signal wire 500 may have an impedance ranging from 50 ohms to 150 ohms, and with the shielding layer 530, the electromagnetic interference may be reduced, so as to increase a transmission distance of the transmission cable. A material of the shielding layer 530 may include aluminum foil, copper foil, copper mesh, or the like, for example. In other words, in the embodiment, the signal wire 500 covered by the shielding layer 530 is able to effectively avoid electromagnetic interference, so as to allow long-distance transmission of the eDP signal or V-by-one signal. In an embodiment, further to transmitting the eDP signal or the V-by-one signal, the core conductors 510_1 and 510_2 may also transmit other common signals (e.g., signals transmitted via the HDMI, UART interface, SPI interface, V-by-one interface, or I2C interface, etc.), or at least one of the core conductors 510_1 and 510_2 may transmit power and serve as a power wire. In another embodiment, a transmission bandwidth of the transmission cable of the disclosure may range from 2.5 Gbps to 8 Gbps. In yet another embodiment, an upper limit of a transmission frequency of the transmission cable of the disclosure may be 5 Gbps. The disclosure does not intend to limit the number of signal wires or power wires, and a combination of the numbers may be arbitrarily modified or arranged based on the design needs.

Figure 5:
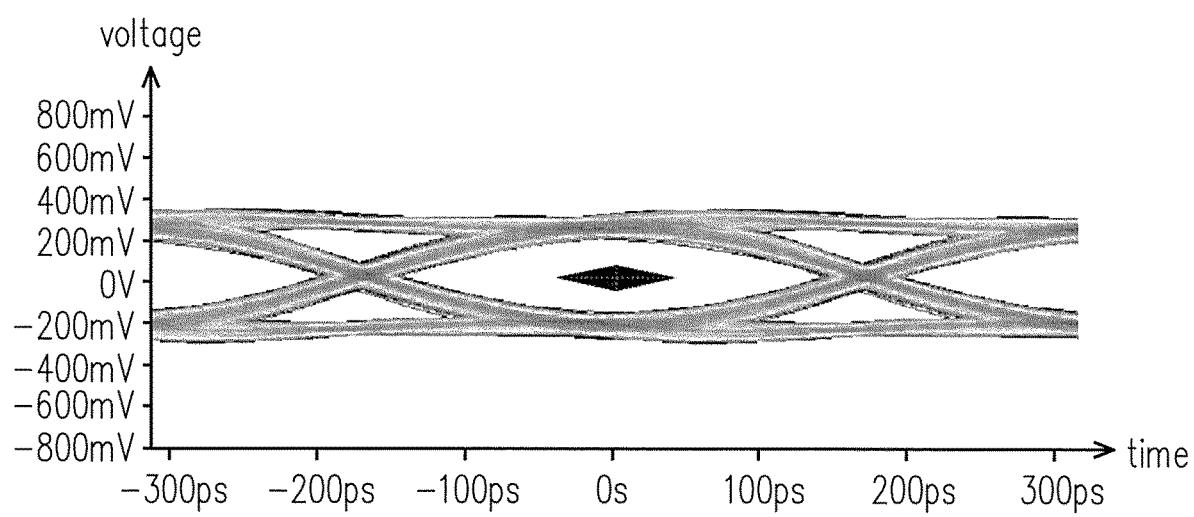
FIG. 5 is a schematic view illustrating a signal eye pattern of a transmission cable according to an embodiment of the disclosure.

FIG. 5 is a schematic view illustrating a signal eye pattern of a transmission cable according to an embodiment of the disclosure. Referring to FIGS. 1 and 5, a length of the transmission cable 100 of the disclosure may be in a range from 0.3 m to 5 m. Since the transmission cable of the disclosure includes the shielding layer, and the differential signal is transmitted via the signal wire, the transmission cable of the disclosure may transmit a signal in a long distance with a preferable signal transmission quality. For example, the signal eye diagram of FIG. 5 illustrates results of signal measurement at a receiving end during actual transmission of the V-by-one signal through the transmission cable 100 in a case when a length of the transmission cable 100 is 2 m. As shown in FIG. 5, the transmission cable 100 in a length of 2 m renders preferable results of high speed signal transmission, and complies with electric standards of the V-by-one signal.

Figure 6:
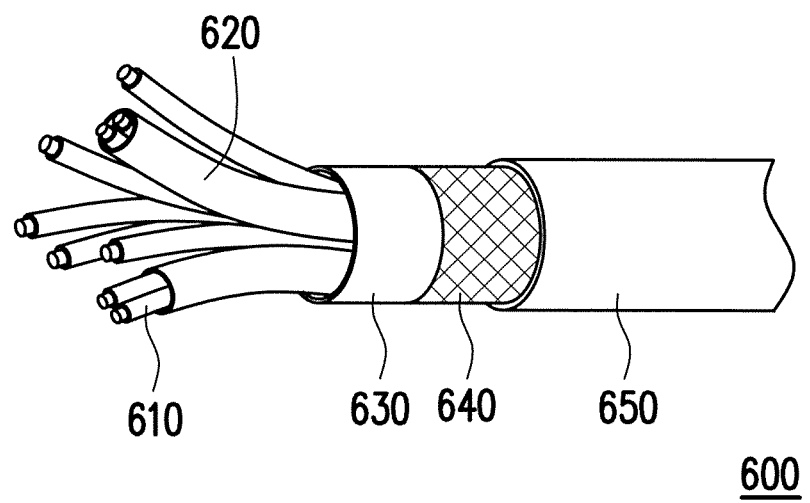
FIG. 6 is a schematic view illustrating a transmission cable according to another embodiment of the disclosure.

FIG. 6 is a schematic view illustrating a transmission cable according to another embodiment of the disclosure. The transmission cable of the respective embodiments of the disclosure be as shown in FIG. 6. Referring to FIG. 6, a transmission cable 600 may include a plurality of pairs of stranded wires. A pair of stranded wires may include an inner layer core 610 formed by two coaxial wires (e.g., the signal wire 300 shown in FIG. 3) or a pair of differential signal wires (e.g., the signal wire 400 as shown in FIG. 4) and a shielding layer 620 covering the inner layer core. A material of the shielding layer 620 may include copper coil, aluminum coil, or the like, and the shielding layer 620 may be further covered by a plastic sheet as an insulating layer. Then, the pairs of stranded wires are further covered by another shielding layer 630 and a metal mesh layer 640 formed by steel wires or copper wires. Then, at an outermost layer, the cable is covered by another shielding layer 650 including polyvinyl chloride (PVC). Therefore, the single transmission cable of the disclosure integrates a plurality of signal wires and is able to effectively reduce electromagnetic interference, so as to allow long-distance and high-speed transmission.

Figure 7:
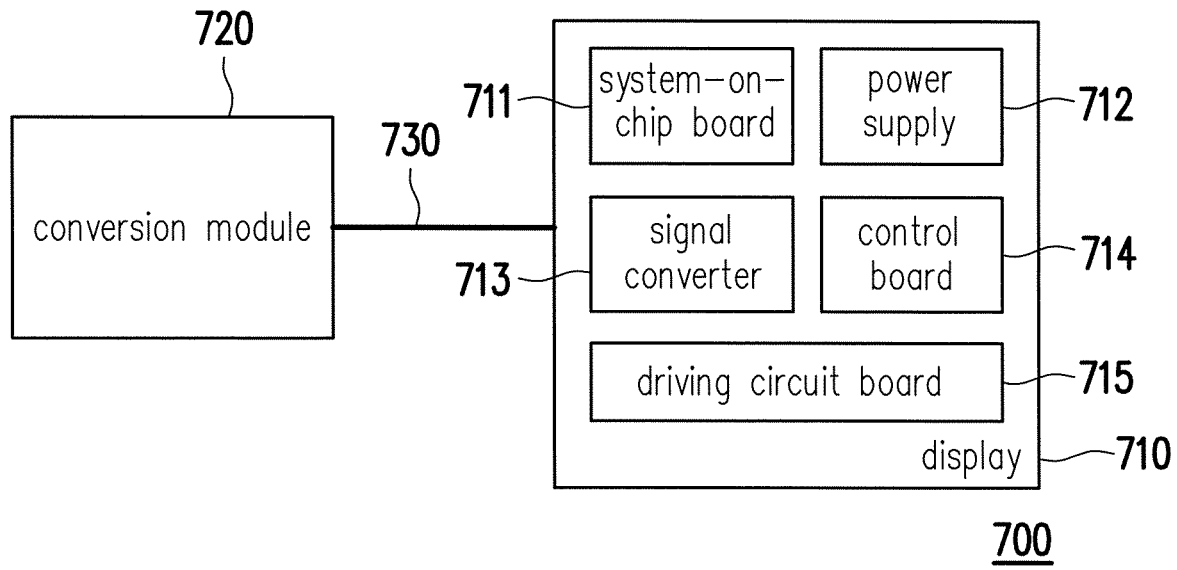
FIG. 7 is a schematic block diagram illustrating a display system according to an embodiment of the disclosure.

FIG. 7 is a schematic block diagram illustrating a display system according to an embodiment of the disclosure. Referring to FIG. 7, a display system 700 includes a display 710 and a conversion module 720. In the embodiment, the display 710 may include a system-on-chip (SoC) board 711, a power supply 712, a signal converter 713, a control board 714, and a driving circuit board 715 (X Board). In the embodiment, a transmission cable 730 couples the display 710 and the conversion module 720, and serves to transmit a signal between the display 710 and the conversion module 720. In the embodiment, the transmission cable 730 may serve to transmit an image signal, an audio signal, a power signal, a universal asynchronous receiver/transmitter (UART) signal, a serial peripheral interface bus (SPI) signal, a pulse width modulation (PWM) signal, a V-by-one signal, an LED backlight unit (BLU) control signal, or a system control signal, etc. The transmission cable 730 may be compatible with the HDMI, the UART interface, the SPI interface, the V-by-one interface, the I2C interface, or the like. In other words, in the embodiment, the transmission cable 730 may serve to integrate the signal wires, control wires, power wires, or grounding wires for various signals into a single cable as shown in FIG. 6 to reduce the number of cables between the display 710 and the conversion module 720.

In the embodiment, the display 710 may be a liquid crystal display (LCD), particularly a large-sized LCD, such as a LCD in a size of 45 inches, 50 inches, 58 inches, 100 inches, or the like. However, the disclosure is not limited thereto. In the embodiment, the SoC board 711 may provide an image signal, a driving signal, or a control signal to the control board 714 to operate the display 710. In addition, the control board 714 may convert and process the image signal based on the image signal, the driving signal, or the control signal provided by the SoC board 711. The control board 714 may include a timing controller (TCON), for example, to provide the image signal to the driving circuit board 715, so as to drive the display 710 to execute a display function. Moreover, in the embodiment, the conversion module 720 is a digital video converter. The conversion module 720 may be coupled to a device with an external signal source in a wired or wireless manner, and convert a source signal into an image display content.

Figure 8:
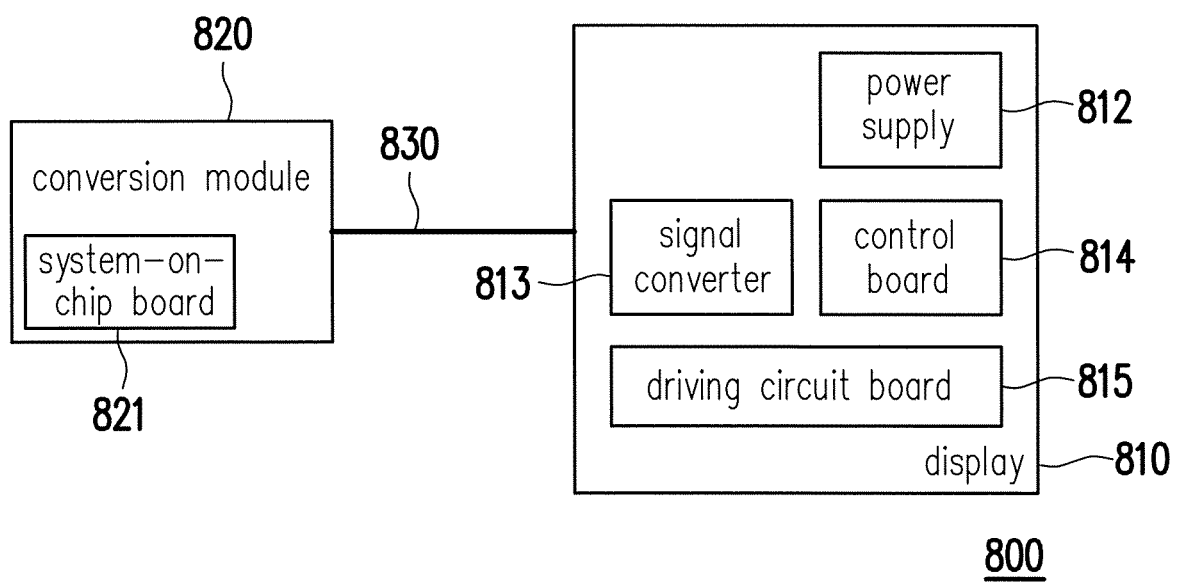
FIG. 8 is a schematic block diagram illustrating a display system according to another embodiment of the disclosure.

FIG. 8 is a schematic block diagram illustrating a display system according to another embodiment of the disclosure. Referring to FIG. 8, a display system 800 includes a display 810 and a conversion module 820. In the embodiment, a transmission cable 830 couples the display 810 and the conversion module 820, and serves to transmit a signal between the display 810 and the conversion module 820. The display 810 of the embodiment may include a power supply 812, a signal converter 813, a control board 814, and a driving circuit board 815. In addition, the conversion module 820 of the embodiment may include a system-on-chip (SoC) board 821.

It should be noted that, to reduce a thickness of the display 810, the space for accommodating some of the circuits or wires in the display 810 may be reduced. In the embodiment, the transmission cable 830 may serve to integrate the signal wires, control wires, power wires, or grounding wires for various signals between the display 810 and the conversion module 820 into a single cable, so as to reduce the number of cables between the display 810 and the conversion module 820. In other words, the conversion module 820 of the embodiment may include the SoC board 821 to allow the conversion module 820 to drive the display 810 through the SoC board 821. Moreover, in the embodiment, the SoC board 821 and the control board 814 respectively have the eDP interface or the V-by-one interface, so that the SoC board 821 of the conversion module 820 may directly output the eDP signal or the V-by-one signal to the control board 814 of the display 810 to drive the display 810. Hence, the display system 800 of the embodiment is able to effectively save the space of the display 810 for accommodating the SoC board.

Figure 9:
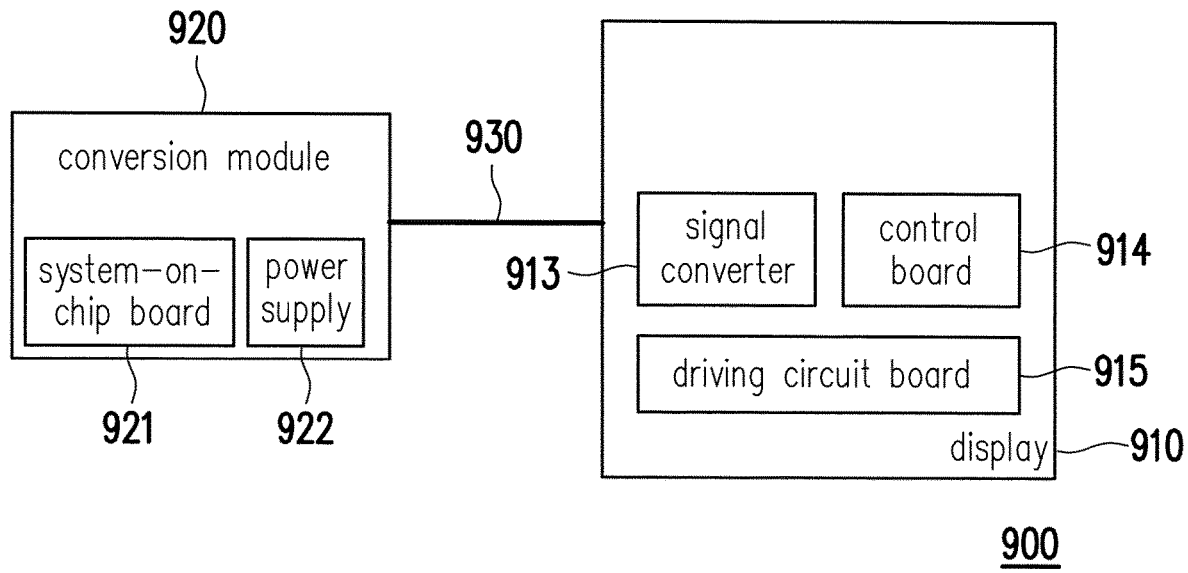
FIG. 9 is a schematic block diagram illustrating a display system according to another embodiment of the disclosure.

FIG. 9 is a schematic block diagram illustrating a display system according to another embodiment of the disclosure. Referring to FIG. 9, a display system 900 includes a display 910 and a conversion module 920. The display 910 of the embodiment may include a signal converter 913, a control board 914, and a driving circuit board 915. In addition, the conversion module 920 of the embodiment may include a system-on-chip (SoC) board 921 and a power supply 922. In the embodiment, a transmission cable 930 couples the display 910 and the conversion module 920, and serves to transmit a signal between the display 910 and the conversion module 920.

It should be noted that, to reduce a thickness of the display 910, the space for accommodating some of the circuits or wires in the display 910 may be reduced. In the embodiment, the transmission cable 930 may serve to integrate the signal wires, control wires, power wires, or grounding wires for various signals between the display 910 and the conversion module 920 into a single cable, so as to reduce the number of cables between the display 910 and the conversion module 920. In other words, the conversion module 920 of the embodiment may include the SoC board 921 and the power supply 922 to allow the conversion module 920 to drive the display 910 through the SoC board 921. In addition, the transmission cable 930 may further include a power wire. Thus, the conversion module 920 may transmit a power signal supplied by the power supply 922 to the display 910 through the transmission cable 930. Hence, the display system 900 of the embodiment is able to effectively save the space of the display 910 for accommodating the SoC board and the power supply.

Figure 10:
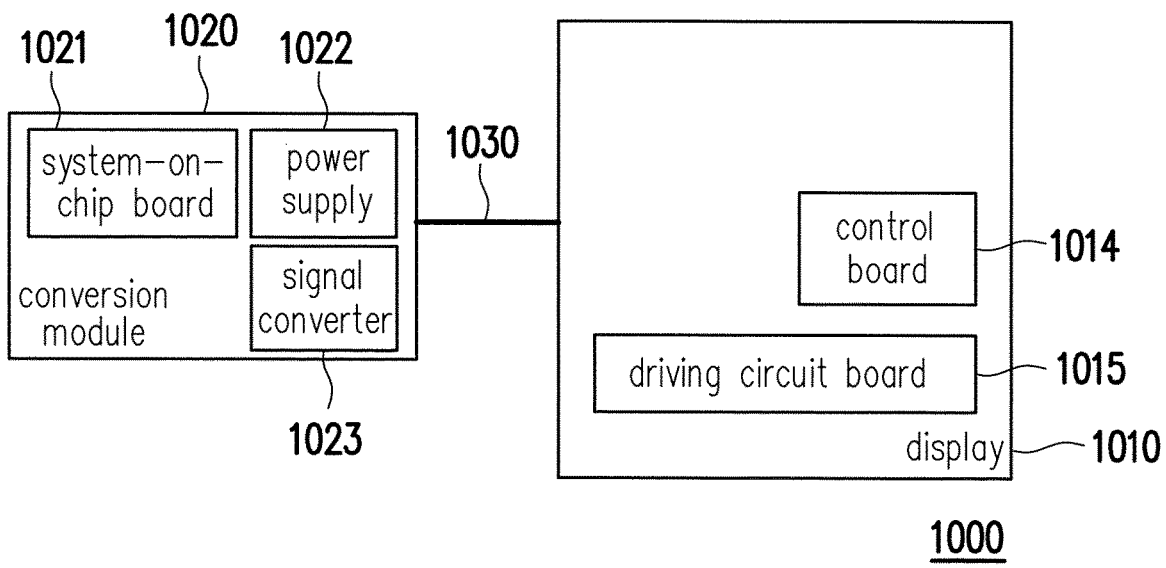
FIG. 10 is a schematic block diagram illustrating a display system according to another embodiment of the disclosure.

FIG. 10 is a schematic block diagram illustrating a display system according to another embodiment of the disclosure. Referring to FIG. 10, a display system 1000 includes a display 1010 and a conversion module 1020. The display 1010 of the embodiment may include a control board 1014 and a driving circuit board 1015. In addition, the conversion module 1020 of the embodiment may include a system-on-chip (SoC) board 1021, a power supply 1022, and a signal converter 1023. In the embodiment, a transmission cable 1030 couples the display 1010 and the conversion module 1020, and serves to transmit a signal between the display 1010 and the conversion module 1020.

It should be noted that, to reduce a thickness of the display 1010, the space for accommodating some of the circuits or wires in the display 1010 may be reduced. In the embodiment, the transmission cable 1030 may serve to integrate the signal wires, control wires, power wires, or grounding wires for various signals between the display 1010 and the conversion module 1020 into a single cable, so as to reduce the number of cables between the display 1010 and the conversion module 1020. In other words, the conversion module 1020 of the embodiment may include the SoC board 1021, the power supply 1022, and the signal converter 1023 to allow the conversion module 1020 to drive the display 1010 through the SoC board 1021. In addition, the transmission cable 1030 may further include a power wire. Thus, the conversion module 1020 may transmit a power signal supplied by the power supply 1022 to the display 1010 through the transmission cable 1030. Besides, the conversion module 1020 may convert at least one of the HDMI signal, the UART signal, the SPI signal, the V-by-one signal, and the I2C signal into the eDP signal or the V-by-one signal through the signal converter 1023. Hence, the display system 1000 of the embodiment is able to effectively save the space of the display 1010 for accommodating the SoC board, the power supply, and the signal converter.

Figure 11:
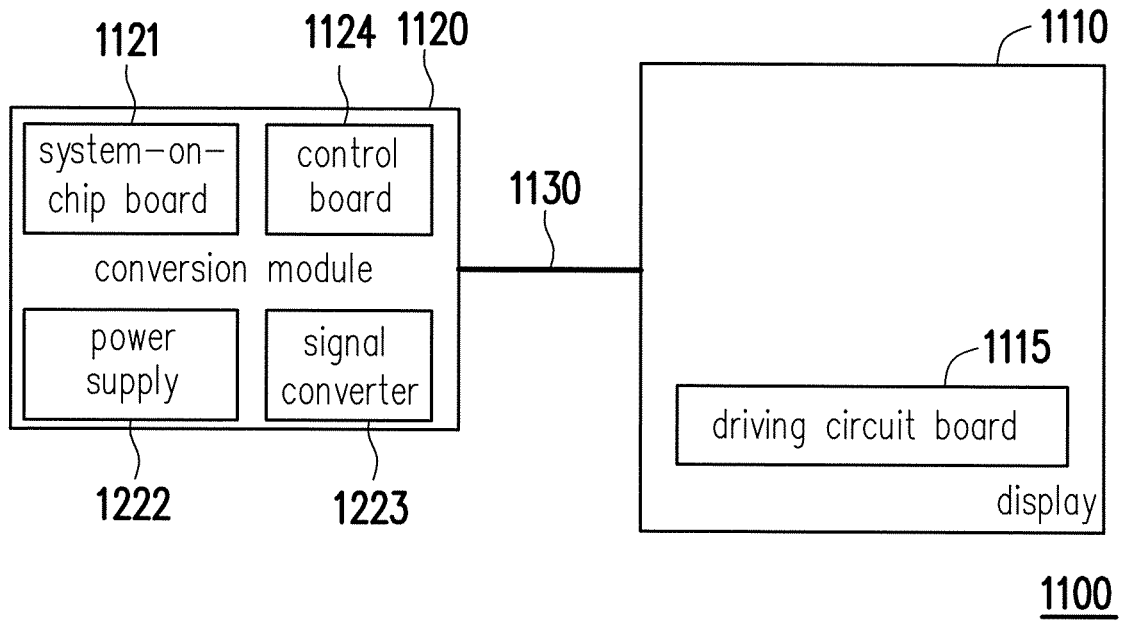
FIG. 11 is a schematic block diagram illustrating a display system according to another embodiment of the disclosure.

FIG. 11 is a schematic block diagram illustrating a display system according to another embodiment of the disclosure. Referring to FIG. 11, a display system 1100 includes a display 1110 and a conversion module 1120. The display 1110 of the embodiment may include a driving circuit board 1115. In addition, the conversion module 1120 of the embodiment may include a system-on-chip (SoC) board 1121, a power supply 1122, a signal converter 1123, and a control board 1124. In the embodiment, a transmission cable 1130 couples the display 1110 and the conversion module 1120, and serves to transmit a signal between the display 1110 and the conversion module 1120.

It should be noted that, to reduce a thickness of the display 1110, the space for accommodating some of the circuits or wires in the display 1110 may be reduced. In the embodiment, the transmission cable 1130 may serve to integrate the signal wires, control wires, power wires, or grounding wires for various signals between the display 1110 and the conversion module 1120 into a single cable, so as to reduce the number of cables between the display 1110 and the conversion module 1120. In other words, the conversion module 1120 of the embodiment may include the SoC board 1121, the power supply 1122, the signal converter 1123, and the control board 1124 to allow the conversion module 1120 to directly drive the display 1110 through the control board 1124. In addition, the transmission cable 1130 may further include a power wire. Thus, the conversion module 1120 may transmit a power signal supplied by the power supply 1122 to the display 1110 through the transmission cable 1130. Besides, the conversion module 1120 may convert at least one of the HDMI signal, the UART signal, the SPI signal, the V-by-one signal, and the I2C signal into the eDP signal or the V-by-one signal through the signal converter 1123. Hence, the display system 1100 of the embodiment is able to effectively save the space of the display 1110 for accommodating the SoC board, the power supply, the signal converter, and the control board.

Figure 12:
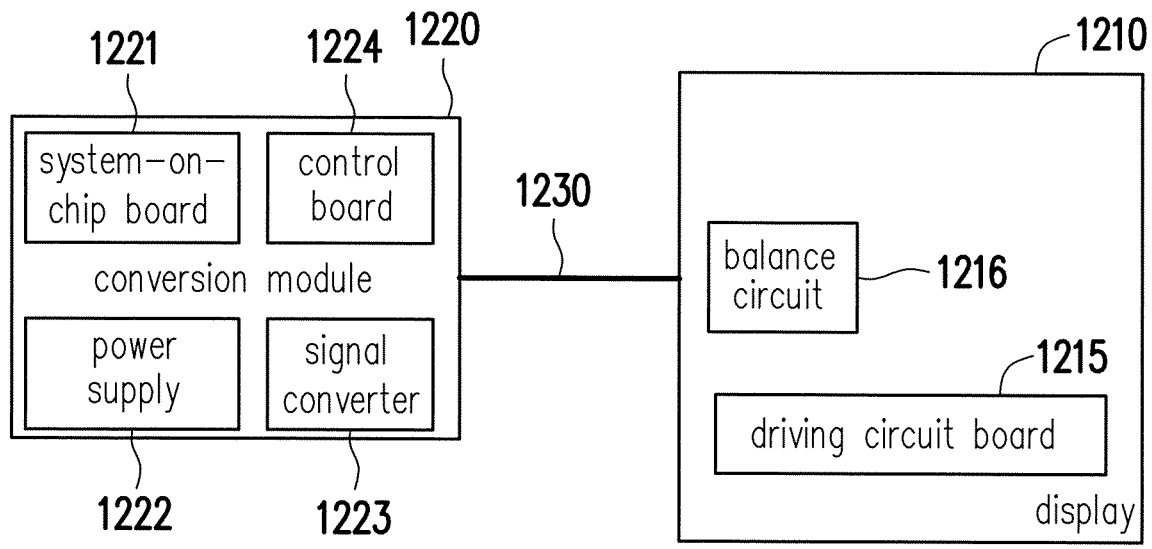
FIG. 12 is a schematic block diagram illustrating a display system according to another embodiment of the disclosure.

FIG. 12 is a schematic block diagram illustrating a display system according to another embodiment of the disclosure. In the embodiment, a transmission cable 1230 couples the display 1210 and the conversion module 1220, and serves to transmit a signal between the display 1210 and the conversion module 1220. The display 1210 of the embodiment may include a driving circuit board 1215 and a balance circuit 1216. In addition, the conversion module 1220 of the embodiment may include a system-on-chip (SoC) board 1221, a power supply 1222, a signal converter 1223, and a control board 1224.

It should be noted that, to reduce a thickness of the display 1210, the space for accommodating some of the circuits or wires in the display 1210 may be reduced. In the embodiment, the transmission cable 1230 may serve to integrate the signal wires, control wires, power wires, or grounding wires for various signals between the display 1210 and the conversion module 1220 into a single cable, so as to reduce the number of cables between the display 1210 and the conversion module 1220. In other words, the conversion module 1220 of the embodiment may include the SoC board 1221, the power supply 1222, the signal converter 1223, and the control board 1224 to allow the conversion module 1220 to directly drive the display 1210 through the control board 1224. The display 1210 may include the balance circuit 1216. The balance circuit 1216 may serve to adjust a color tone, brightness, or the like, for example, of a display frame of the display. In addition, the transmission cable 1230 may further include a power wire and a control signal wire. Thus, the conversion module 1220 may transmit a power signal provided by the power supply 1222 to the display 1210 through the transmission cable 1230 and provide a control signal to the balance circuit 1216 of the display 1210. Besides, the conversion module 1220 may convert at least one of the HDMI signal, the UART signal, the SPI signal, the V-by-one signal, and the I2C signal into the eDP signal or the V-by-one signal through the signal converter 1223. Hence, the display system 1200 of the embodiment is able to effectively save the space of the display 1210 for accommodating the SoC board, the power supply, the signal converter, and the control board.

In view of the foregoing, the transmission cable according to the embodiments of the disclosure serves to transmit the differential signal compatible with the eDP interface, the V-by-one interface, or other signal interfaces. The transmission cable according to the embodiments of the disclosure may include the signal wire transmitting the differential signal and the shielding layer covering the signal wire. Thus, the transmission cable according to the embodiments of the disclosure allows to transmit the eDP signal or the V-by-one signal in a longer distance. Moreover, the transmission cable according to the embodiments of the disclosure is suitable for an application of board-to-board connection or an application of device-to-device communication. By adopting the transmission cable according to the embodiments of the disclosure, transmission in a longer distance is enabled, unlike the conventional transmission of the V-by-one signal, the eDP signal, or other signals through the FFC or FPC board that only allows board-to-board transmission in a short distance between internal modules of a liquid crystal display (LCD), and the transmission may not be limited to the inside of the display. In other words, the types of signals transmitted by the transmission cable according to the embodiments of the disclosure may be determined based on different display systems, and how the display system is configured may be determined based on how the circuits in the display and the conversion module are configured. Therefore, in addition to effectively providing long-distance transmission of the eDP signal or the V-by-one signal, the transmission cable according to the embodiments of the disclosure may further integrate various wires of control signals or image signals in a single transmission cable to reduce the space for accommodating the circuits.

The characteristics of the respective embodiments may be combined or used together based on the design needs, and the disclosure does not intend to impose a limitation in this regard. Moreover, the display in the respective embodiments may be a liquid crystal display (LCD), a light emitting diode (LED) display, an organic light emitting diode (OLED) display, a quantum-dot-included display (the quantum dots may be used at any layer of the backlight module or the display panel), or any display compatible with the signal interface of the embodiments of the disclosure. Moreover, the display according to the embodiments of the disclosure may be a curve display, a flexible/foldable display, or a free shape display.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A transmission cable, comprising:
   a signal wire, configured to transmit a differential signal provided by an eDP interface or a V-by-one interface;
   a shielding layer, configured to cover the signal wire,
   wherein one end of the signal wire receives the differential signal provided by the eDP interface or the V-by-one interface, and another end of the signal wire outputs the differential signal to another eDP interface or another V-by-one interface; and a first connector and a second connector, wherein each of the first connector and the second connector comprises:
a plug, having a port, wherein the plug has a chamfered corner,
wherein the chamfered corners are respectively located on opposite sides of the first connector and the second connector.

2. The transmission cable as claimed in claim 1, wherein the signal wire comprises two coaxial wires or a pair of differential signal wire.

3. The transmission cable as claimed in claim 1, wherein the signal wire has an impedance ranging from 50 ohms to 150 ohms.

4. The transmission cable as claimed in claim 1,
wherein the first connector and the second connector are configured to respectively couple a conversion module and a display, wherein each of the first connector and the second connector further comprises:
a cover, coupled to the plug,
wherein the port of the plug has a plurality of terminals.

5. The transmission cable as claimed in claim 4, wherein the display comprises a control board, the conversion module comprises a system-on-chip board, the system-on-chip board and the control board respectively have the eDP interface or the V-by-one interface, and the system-on-chip board of the conversion module outputs the differential signal to the control board through the transmission cable to drive the display.

6. The transmission cable as claimed in claim 4, wherein the conversion module comprises a power supply, the transmission cable further comprises a power wire, and the conversion module transmits a power signal provided by the power supply to the display through the power wire of the transmission cable.

7. The transmission cable as claimed in claim 4, wherein the conversion module comprises a signal converter, the signal converter is configured to convert at least one of the HDMI signal, the UART signal, the SPI signal, the V-by-one signal, and the I2C signal into the differential signal.

8. The transmission cable as claimed in claim 4, wherein the conversion module comprises a control board, the control board is configured to provide an image signal to the display through the transmission cable.

9. The transmission cable as claimed in claim 4, wherein the display comprises a balance circuit, the conversion module outputs a control signal to the display through the transmission cable to control the balance circuit.

10. The transmission cable as claimed in claim 1, wherein a length of the transmission cable is between 0.3 meter and 5 meter.

11. A display system, comprising:
a display, having an eDP interface or a V-by-one interface;
a conversion module, having the eDP interface or the V-by-one interface; and
a transmission cable, coupling the display and the conversion module and having a signal wire and a shielding layer, wherein the signal wire is configured to transmit a differential signal between the display and the conversion module, and the shielding layer is configured to cover the signal wire,
wherein the conversion module generates the differential signal through the eDP interface or the V-by-one interface, and the differential signal is output to the eDP interface or the V-by-one interface of the display through the transmission cable,
wherein the conversion module comprises a power supply, the transmission cable further comprises a power wire, and the conversion module transmits a power signal provided by the power supply to the display through the power wire of the transmission cable.

12. The display system as claimed in claim 11, wherein the signal wire comprises two coaxial wires or a pair of differential signal wire.

13. The display system as claimed in claim 11, wherein the signal wire has an impedance ranging from 50 ohms to 150 ohms.

14. The display system as claimed in claim 11, wherein the transmission cable comprises a first connector and a second connector respectively coupling the conversion module and the display, and each of the first connector and the second connector comprises:
a plug, having a port, wherein the plug has a chamfered corner and the port has a plurality of terminals; and
a cover, coupled to the plug.

15. The display system as claimed in claim 11, wherein the display comprises a control board, the conversion module comprises a system-on-chip board, the system-on-chip board and the control board respectively have the eDP interface or the V-by-one interface, and the system-on-chip board of the conversion module outputs the differential signal to the control board through the transmission cable to drive the display.

16. The display system as claimed in claim 11, wherein the conversion module comprises a signal converter, the signal converter is configured to convert at least one of the HDMI signal, the UART signal, the SPI signal, the V-by-one signal, and the I2C signal into the differential signal.

17. The display system as claimed in claim 11, wherein the conversion module comprises a control board, the control board is configured to provide an image signal to the display through the transmission cable.

18. The display system as claimed in claim 11, wherein the display comprises a balance circuit, the conversion module outputs a control signal to the display through the transmission cable to control the balance circuit.

19. The display system as claimed in claim 11, wherein a length of the transmission cable is between 0.3 meter and 5 meter.

* * * * *